United States Patent
Farshchi et al.

(10) Patent No.: US 7,672,996 B2
(45) Date of Patent: Mar. 2, 2010

(54) METHODS AND APPARATUSES FOR AUTOMATICALLY RECONNECTING A PARTICIPANT TO A CONFERENCE

(75) Inventors: Shawn Farshchi, Santa Clara, CA (US); Eric Montoya, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 415 days.

(21) Appl. No.: 11/626,987

(22) Filed: Jan. 25, 2007

(65) Prior Publication Data

US 2008/0183818 A1    Jul. 31, 2008

(51) Int. Cl.
*G06F 15/16* (2006.01)
(52) U.S. Cl. .............. 709/204; 709/205; 709/203; 709/245; 379/202.01; 713/156; 713/168
(58) Field of Classification Search ......... 709/203–205, 709/245
See application file for complete search history.

(56) References Cited

U.S. PATENT DOCUMENTS

| | | | |
|---|---|---|---|
| 2003/0140121 A1 | 7/2003 | Adams | |
| 2004/0141605 A1* | 7/2004 | Chen et al. ............. | 379/202.01 |
| 2005/0136949 A1 | 6/2005 | Barnes | |
| 2008/0098067 A1* | 4/2008 | O'Sullivan et al. .......... | 709/204 |

OTHER PUBLICATIONS

PCT Notification of Transmittal of the International Search Report and the Written Opinion of the International Searching Authority or the Declaration, International Application No. PCT/US08/52020, International Filing Date: Jan. 25, 2008, Date of Mailing: Jun. 27, 2008, 7 pages total.

* cited by examiner

*Primary Examiner*—Jude J Jean Gilles
(74) *Attorney, Agent, or Firm*—Cesari and McKenna, LLP (57) ABSTRACT

In one embodiment, the methods and apparatuses detect a conference; detect a connection between a participant and the conference; and automatically reconnect the participant with the conference after participant is accidentally disconnected from the conference.

21 Claims, 6 Drawing Sheets

METHODS AND APPARATUSES FOR AUTOMATICALLY RECONNECTING A PARTICIPANT TO A CONFERENCE

FIELD OF INVENTION

The present invention relates generally to reconnecting a participant and, more particularly, to automatically reconnecting a participant to a conference.

BACKGROUND

There has been an increased use in conferencing services to allow participants to exchange information. While participating in conferences, participants are able to interactively exchange voice, sound, video, graphic, and/or textual information. There are instances during a conference when one of the participants is inadvertently disconnected from the conference.

SUMMARY

In one embodiment, the methods and apparatuses detect a conference; detect a connection between a participant and the conference; and automatically reconnecting the participant with the conference after the participant is accidentally disconnected from the conference.

BRIEF DESCRIPTION OF THE DRAWINGS

The accompanying drawings, which are incorporated in and constitute a part of this specification, illustrate and explain one embodiment of the methods and apparatuses for automatically reconnecting a participant to a conference. In the drawings.

DETAILED DESCRIPTION

The following detailed description of the methods and apparatuses for automatically reconnecting a participant to a conference refers to the accompanying drawings. The detailed description is not intended to limit the methods and apparatuses for automatically reconnecting a participant to a conference. Instead, the scope of the methods and apparatuses for automatically reconnecting a participant to a conference is defined by the appended claims and equivalents.

Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

References to a conference include sharing data among multiple devices. The data may include audio, textual, and/or graphical information.

In one embodiment, the methods and apparatuses for automatically reconnecting a participant to a conference selectively apply different privileges to be during a data collaboration session among multiple devices. The selection of a specific privilege depends on the specific devices, the specific groups, and the customization of the profile.

Figure 1:
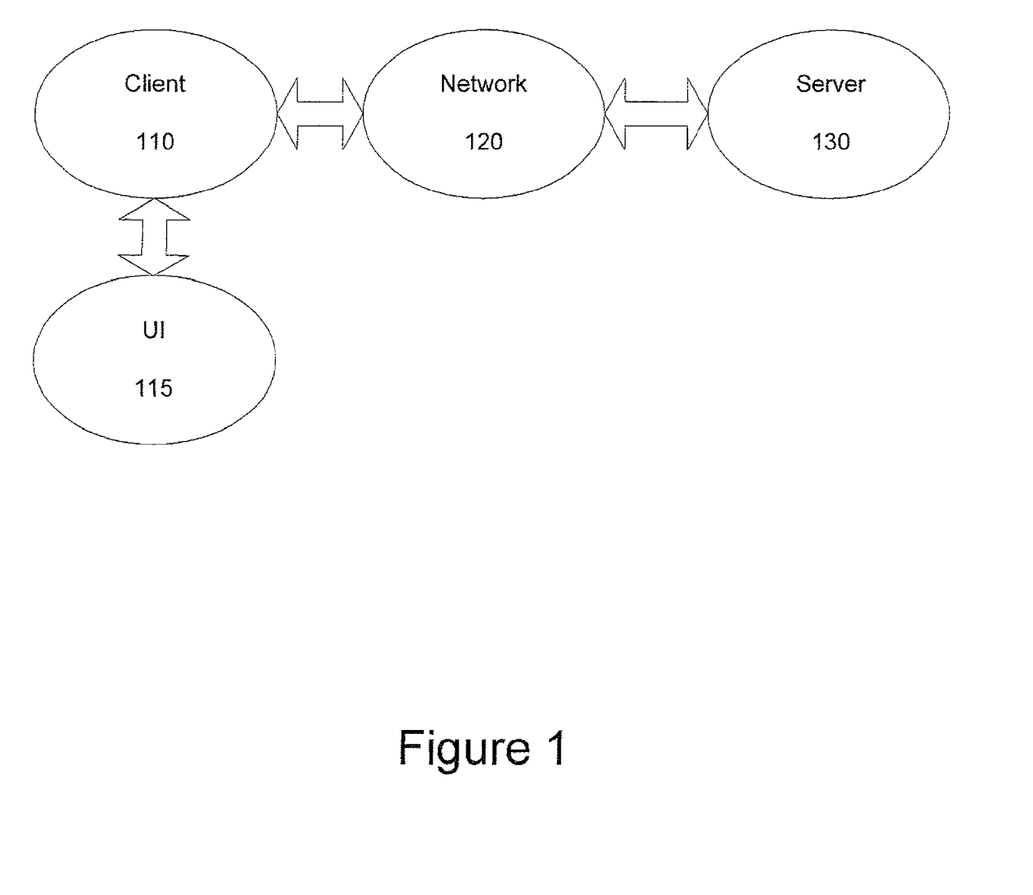
FIG. 1 is a diagram illustrating an environment within which the methods and apparatuses for automatically reconnecting a participant to a conference are implemented.

FIG. 1 is a diagram illustrating an environment within which the methods and apparatuses for automatically reconnecting a participant to a conference are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of automatically reconnecting a participant to a conference below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
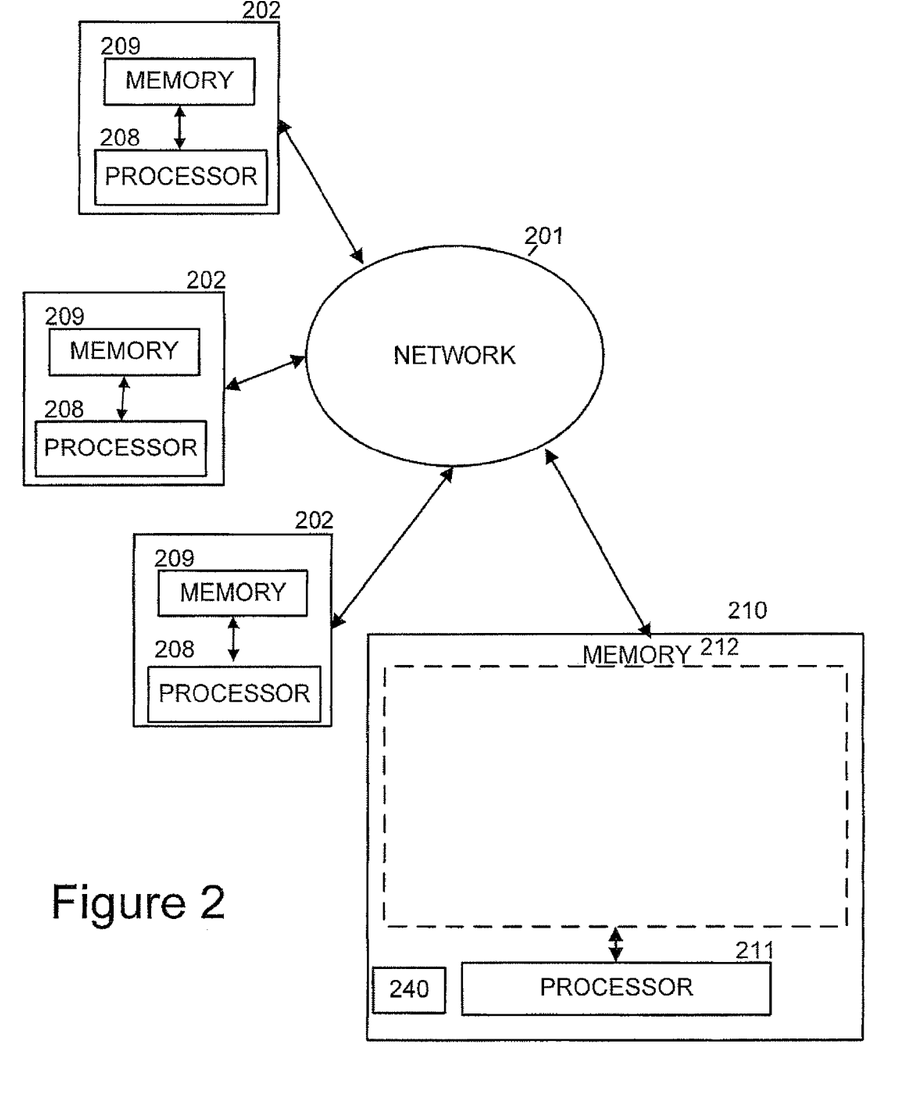
FIG. 2 is a simplified block diagram illustrating one embodiment in which the methods and apparatuses for automatically reconnecting a participant to a conference are implemented.

FIG. 2 is a simplified diagram illustrating an exemplary architecture in which the methods and apparatuses for automatically reconnecting a participant to a conference are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for automatically reconnecting a participant to a conference. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on automatically reconnecting a participant to a conference as determined using embodiments described below.

Figure 3:
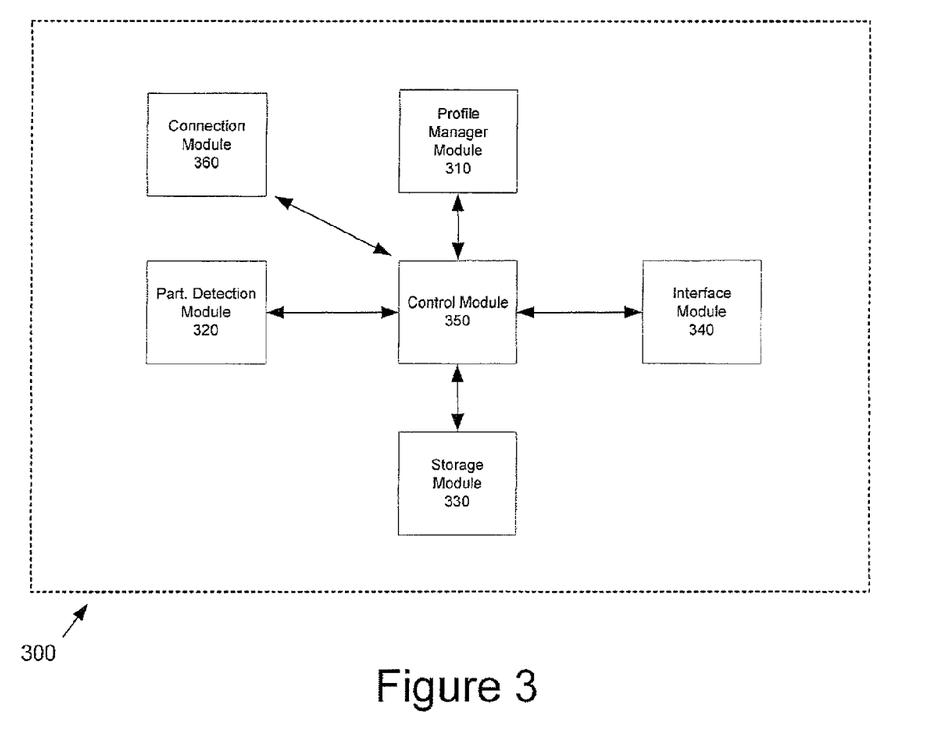
FIG. 3 is a simplified block diagram illustrating a system, consistent with one embodiment of the methods and apparatuses automatically reconnecting a participant to a conference.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a participant detection module 320, a storage module 330, an interface module 340, a control module 350, and a connection module 360.

In one embodiment, the control module 350 communicates with the profile manager module 310, the participant detection module 320, the storage module 330, the interface module 340, the control module 350, and the connection module 360. In one embodiment, the control module 350 coordinates tasks, requests, and communications between the profile manager module 310, the participant detection module 320, the storage module 330, the interface module 340, the control module 350, and the connection module 360.

In one embodiment, the profile manager module 310 organizes and tracks the profiles. In one embodiment, each profile corresponds to a potential participant in a conference. In another embodiment, each profile corresponds to a group of potential participants. In another embodiment, each profile corresponds to participants associated with a company.

In one embodiment, the participant detection module 320 detects and identifies the identity of the participant. In one embodiment, the participant detection module 320 detects the identity of participant through a login identifier associated with the participant. For example, the participant is associated with a login identifier that is established through a device. Further, the participant may utilize any number of devices while still retaining the same login identifier associated with the particular participant.

In one embodiment, the storage module 330 stores a record including a profile associated with the each participant or group of participant s. An exemplary profile is shown in a record 400 within FIG. 4.

In one embodiment, the interface module 340 detects the presence of a device through the network 120.

In one embodiment, the connection module 360 is configured to reconnect a participant to the conference. While participating in the conference, the participant may be accidentally disconnected from the conference. In one embodiment, the cause of the disconnection may occur anywhere along the path in which data signals are exchanged between the participant and the other participant(s).

In one embodiment, the disconnected participant is automatically called back and joined back into the conference via a telephone connection. In one embodiment, the telephone connection may be accomplished via plain-old-telephone-service or voice over IP connections.

In another embodiment, the disconnected participant is automatically invited to rejoin the conference utilizing a visual user interface through a device such as a computer device. For example, although the visual interface in which the conference displays visual data may be accidentally terminated, the connection module 360 may visually signal the device utilized by the disconnected participant to reconnect with the conference.

The system 300 in FIG. 3 is shown for exemplary purposes and is merely one embodiment of the methods and apparatuses for automatically reconnecting a participant to a conference. Additional modules may be added to the system 300 without departing from the scope of the methods and apparatuses for automatically reconnecting a participant to a conference. Similarly, modules may be combined or deleted without departing from the scope of the methods and apparatuses for automatically reconnecting a participant to a conference.

Figure 4:
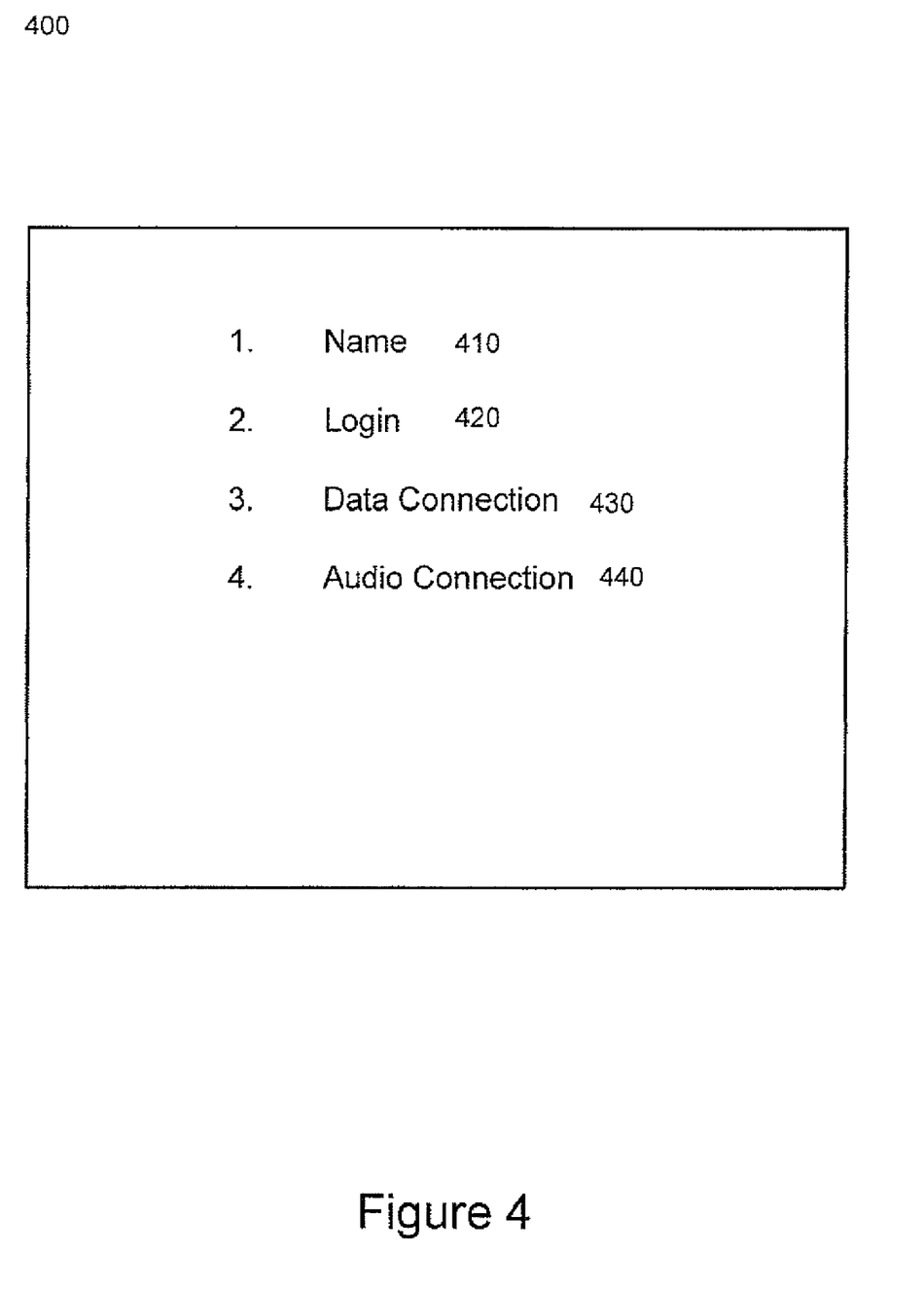
FIG. 4 is an exemplary record for use with the methods and apparatuses for automatically reconnecting a participant to a conference.

FIG. 4 illustrates an exemplary record 400 for use with the methods and apparatuses for automatically reconnecting a participant to a conference. In one embodiment, the record 400 illustrates an exemplary record associated with managing a profile associated with a participant.

In one embodiment, there are multiple records such that each record 400 is associated with a particular group of participants. Further, each participant may correspond with multiple records wherein each record 400 is associated with a particular profile associated with the participant.

In one embodiment, the record 400 includes a name field 410, a login identification field 420, a data connection field 430, and an audio connection field. In one embodiment, the record 400 resides within the client 110. In another embodiment, the record 400 resides within the server 130.

In one embodiment, the name field 410 includes information related to the identity of the participant. For example, the name field 410 may include a name of the participant.

In one embodiment, the login identification field 420 includes a listing the login identification associated with the particular participant.

In one embodiment, the data connection field 430 identifies the range of IP addresses that are recognized to be utilized by devices associated with the participant. In another embodiment, the data connection field 430 identifies the specific IP address utilized by the device associated with the participant during a conference prior to the disconnection of the participant to the conference.

In yet another embodiment, the data connection field 430 identifies the device utilized by the participant through a device serial number during the conference.

In one embodiment, the audio connection field 440 identifies a telephone number associated with participant. In one example, the telephone number is identified prior to the conference. In another example, the telephone number is detected during the most recent conference with the participant.

Figure 5:
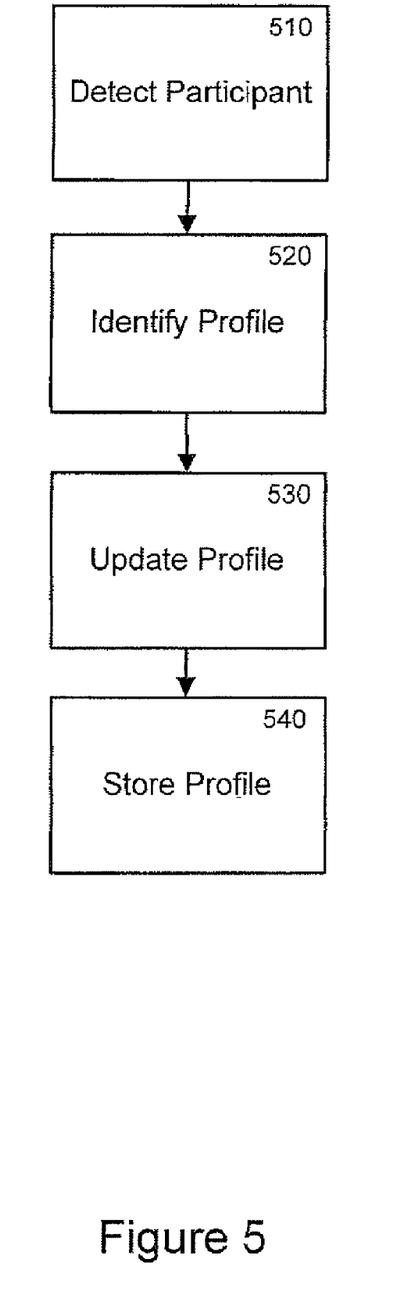
FIG. 5 is a flow diagram consistent with one embodiment of the methods and apparatuses for automatically reconnecting a participant to a conference.
Figure 6:
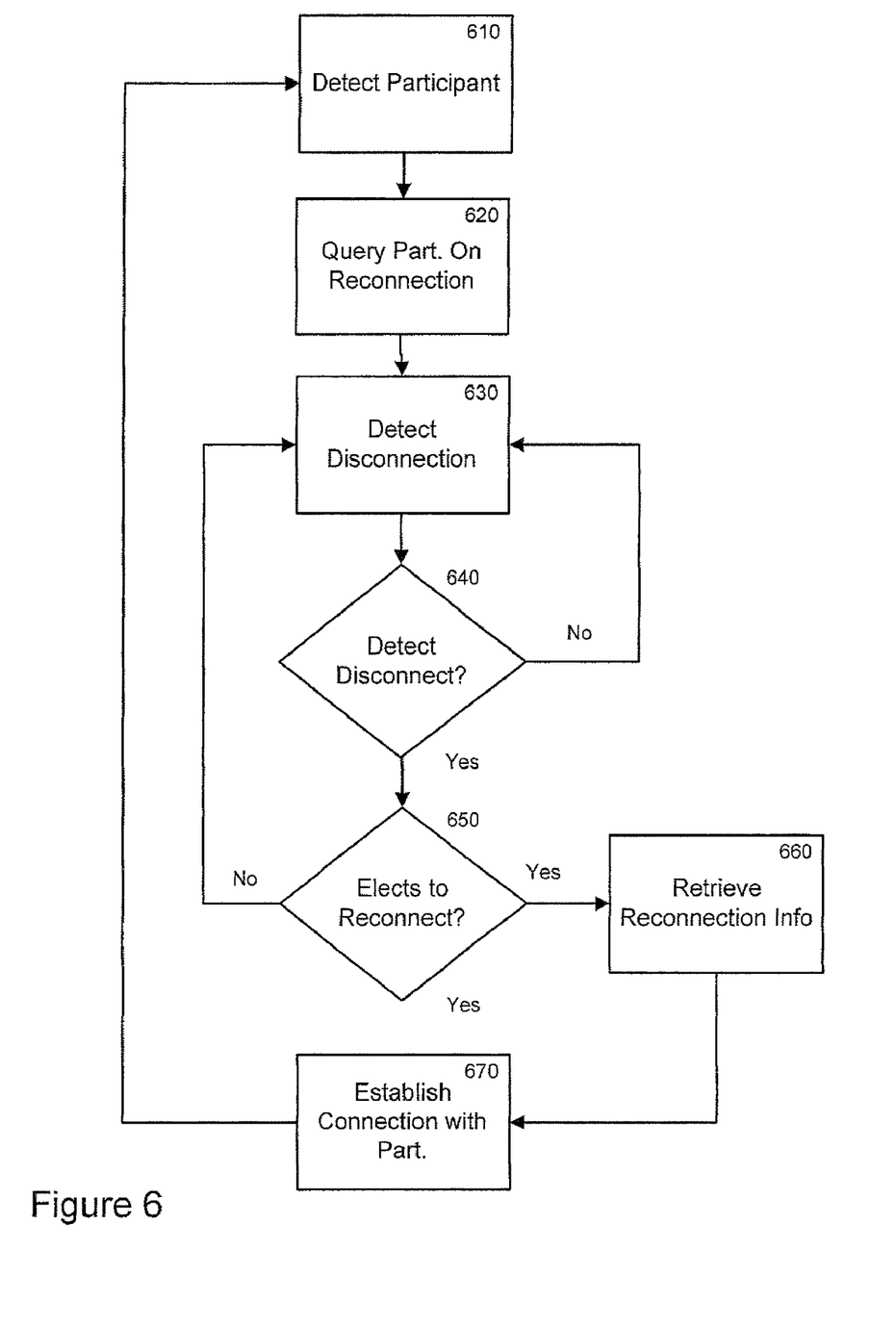
FIG. 6 is a flow diagram consistent with one embodiment of the methods and apparatuses for automatically reconnecting a participant to a conference.

The flow diagrams as depicted in FIGS. 5 and 6 are one embodiment of the methods and apparatuses for automatically reconnecting a participant to a conference. The blocks within the flow diagrams can be performed in a different sequence without departing from the spirit of the methods and apparatuses for automatically reconnecting a participant to a conference. Further, blocks can be deleted, added, or combined without departing from the spirit of the methods and apparatuses for automatically reconnecting a participant to a conference.

The flow diagram in FIG. 5 illustrates customizing an exemplary record for use during a conference according to one embodiment of the invention.

In Block 510, a participant is detected. In one embodiment, the participant is detected as the participant utilizes a login identification. In another embodiment, the participant is detected as the participant joins a conference.

In Block 520, a profile is identified that is associated with the participant.

In Block 530, the profile is updated. In one embodiment, the profile is updated by information provided by the participant. In another embodiment, the profile is updated by information gathered from a conference that is joined by the associated participant.

In one embodiment, exemplary profile information is shown within the record 400.

In Block 540, the profile for the participant is stored within a storage module 330.

The flow diagram in FIG. 6 illustrates limiting transmission of data during a data collaboration session according to one embodiment of the invention.

In Block 610, a participant is detected prior to joining a conference. In one embodiment, the participant is identified through a login identification that uniquely identifies the participant. In another embodiment, a device is identified being associated with the participant through the IP address that is utilized by the device or the serial number of the device.

In Block 620, the participant is offered an option for automatic reconnection to the conference in one embodiment.

If the participant selects automatic reconnection with the conference, the participant is able to elect the path for reconnection. For example, the participant may utilize reconnection information stored within an associated profile in one embodiment. In another embodiment, the participant may elect more current reconnection information such as an updated phone number and/or a current connection from a device currently being utilized by the participant.

In one embodiment, the participant elects to utilize the current connection for the conference as the path for automatic reconnection. In this instance, another channel is opened as a backup connection in addition to the connection for the conference. This backup connection is utilized to automatically reconnect the participant to the conference in one embodiment. Further, the backup connection may be in the form of another browser window that is initiated on the device utilized by the participant.

In Block 630, the participants that are disconnected from the conference are detected.

In Block 640, if a participant is disconnected from the conference, then reconnection preferences of the disconnected participant are reviewed in Block 650. If there is no disconnected participant from the conference, then continued monitoring occurs in the Block 630.

In Block 650, if the participant disconnected from the conference elects to be automatically reconnected, then information relative to the connection is determined in Block 660. In one embodiment, the participant has elected to be automatically reconnected with information found within the profile associated with the participant. In another embodiment, the participant has elected more updated connection information such as connection information corresponding to the current conference prior to disconnection from the conference.

In Block 670, the disconnected participant is reconnected to the conference through the connection information determined from the Block 660.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   detecting a conference;
   detecting a connection between a participant and the conference, the connection having corresponding connection information;
   detecting an accidental disconnection between the participant and the conference; and
   automatically reconnecting the participant with the conference over a backup connection different from the connection used prior to the accidental disconnection, after the participant is accidentally disconnected from the conference, using connection information contained within a profile associated with the participant, the connection information contained within the profile to differ from the connection information corresponding to the connection used prior to the accidental disconnection from the conference.

2. The method according to claim 1 wherein the conference is a data collaboration session.

3. The method according to claim 1 wherein the conference is an audio collaboration session.

4. The method according to claim 1 further comprising verifying with the participant that automatically reconnecting the connection is desired.

5. The method according to claim 1 wherein automatically reconnecting the participant further comprises calling the participant at a predetermined telephone identifier.

6. The method according to claim 5 wherein the telephone identifier is a telephone number.

7. The method according to claim 1 wherein automatically reconnecting the participant further comprises directing a window on a device utilized by the participant to a predetermined location.

8. The method according to claim 7 wherein the predetermined location is represented by a Uniform resource Locator (URL) address.

9. The method according to claim 1 further comprising confirming a contact identifier to automatically reconnect the participant.

10. The method according to claim 9 wherein the contact identifier is within the profile associated with the participant.

11. The method according to claim 9 wherein the contact identifier is a telephone number associated with the participant.

12. The method according to claim 9 wherein the contact identifier is an Internet Protocol (IP) address associated with the participant.

13. The method according to claim 9 wherein the contact identifier is a device identifier that corresponds with a device utilized with the participant.

14. A system, comprising:
- a processor configured to execute an application having a plurality of modules;
- a participant detection module configured to detect a participant within a conference;
- a connection module configured to detect an accidental disconnection between the participant and the conference, the connection module further configured to automatically reconnect the participant to the conference, over a backup connection different from a connection used prior to the accidental disconnection, after the participant is accidentally disconnected from the conference, using contact information associated with the participant, the contact information associated with the participant to differ from contact information used immediately prior to the accidental disconnection from the conference; and
- a storage module configured to store the contact information associated with the participant in a profile for use with automatically reconnecting the participant to the conference.

15. The system according to claim 14 further comprising a profile module configured to store information related to the participant within the profile.

16. The system according to claim 14 wherein the contact information associated with the participant is confirmed by the participant and related to the conference.

17. The system according to claim 14 wherein the contact information is based on a past connection between the participant and the conference.

18. The system according to claim 14 wherein the contact information associated with the participant is a telephone number.

19. The system according to claim 14 wherein the contact information associated with the participant is an IP address.

20. The system according to claim 14 wherein the contact information associated with the participant is a serial number for a device utilized by the participant.

21. An apparatus comprising:
- a processor;
- a memory;
- means for detecting a conference;
- means for detecting a connection between a participant and the conference, the connection having corresponding connection information;
- means for detecting an accidental disconnection between the participant and the conference; and
- means for automatically reconnecting the participant with the conference over a backup connection different from the connection used prior to the accidental disconnection after the participant is accidentally disconnected from the conference, using connection information contained within a profile associated with the participant, the connection information contained within the profile to differ from the connection information corresponding to the connection used prior to the accidental disconnection from the conference.

* * * * *